(12) United States Patent
Gordic et al.

(10) Patent No.: US 10,247,168 B2
(45) Date of Patent: Apr. 2, 2019

(54) ROTATIONAL MECHANICAL TRANSFORMER APPARATUS AND METHODS

(71) Applicants: Vujo Gordic, Uzice (RS); Branislav Djolevic, Montgomery Village, MD (US); Miodrag Cekic, Bethesda, MD (US)

(72) Inventors: Vujo Gordic, Uzice (RS); Branislav Djolevic, Montgomery Village, MD (US); Miodrag Cekic, Bethesda, MD (US)

( * ) Notice: Subject to any disclaimer, the term of this patent is extended or adjusted under 35 U.S.C. 154(b) by 182 days.

(21) Appl. No.: 15/499,069

(22) Filed: Apr. 27, 2017

(65) Prior Publication Data

US 2018/0313325 A1 Nov. 1, 2018

(51) Int. Cl.

| | |
|---|---|
| F03D 9/17 | (2016.01) |
| F03C 1/26 | (2006.01) |
| F03C 1/007 | (2006.01) |
| F03C 1/00 | (2006.01) |
| F04C 2/344 | (2006.01) |
| F04C 14/04 | (2006.01) |
| H02K 7/18 | (2006.01) |
| H02S 10/12 | (2014.01) |
| F03C 1/02 | (2006.01) |
| F03C 1/047 | (2006.01) |
| F03D 9/28 | (2016.01) |

(52) U.S. Cl.
CPC ............... *F03C 1/26* (2013.01); *F03C 1/002* (2013.01); *F03C 1/007* (2013.01); *F03C 1/02* (2013.01); *F03C 1/047* (2013.01); *F03D 9/17* (2016.05); *F03D 9/28* (2016.05); *F04C 2/344* (2013.01); *F04C 14/04* (2013.01); *H02K 7/183* (2013.01); *H02K 7/1823* (2013.01); *H02S 10/12* (2014.12); *Y02E 10/72* (2013.01)

(58) Field of Classification Search
CPC .......... F03D 9/178; F04C 14/04; H02S 10/12
See application file for complete search history.

(56) References Cited

U.S. PATENT DOCUMENTS

| 903,372 | A | * | 11/1908 | Gardner | F04B 49/02 |
| | | | | | 417/1 |
| 4,598,628 | A | * | 7/1986 | Courtright | F01B 13/06 |
| | | | | | 91/481 |

(Continued)

*Primary Examiner* — Thomas E Lazo
(74) *Attorney, Agent, or Firm* — Miodrag Cekic; Intellectual Property Strategists, LLC

(57) ABSTRACT

A rotational mechanical transformer has been arranged for transfer and transformation of velocity, force, angular momentum, torque, energy/work, energy density, and pressure, associated with at least one rotating device. The transformer includes an actuator having at least one cylinder arranged to contain the at least one working fluid, an externally supported shaft and a drive shaft having parallel axes orthogonally displaced by a predetermined displacement, and each respectively connected to at least one connecting arm and at least one additional connecting arm. The at least one cylinder includes at least one actuator rod and at least one blind end each respectively connected with at least one revolving eccenter axle and the at least one drive shaft, and have been arranged to allow for angular displacements of the at least one actuator with respect to the parallel axis.

20 Claims, 12 Drawing Sheets

(56) References Cited

U.S. PATENT DOCUMENTS

| | | | | |
|---|---|---|---|---|
| 6,752,064 B2 * | 6/2004 | Wheeler | ............. | F01B 17/02 |
| | | | | 417/515 |
| 7,183,664 B2 * | 2/2007 | McClintic | ............. | F03D 7/0236 |
| | | | | 290/55 |
| 7,419,366 B2 * | 9/2008 | Doleh | ............. | F03B 13/147 |
| | | | | 417/333 |
| 7,605,489 B1 * | 10/2009 | Blank | ............. | F03D 9/25 |
| | | | | 290/44 |
| 8,894,386 B1 * | 11/2014 | Hershberger | ............. | F04B 17/02 |
| | | | | 417/294 |
| 2009/0129953 A1 * | 5/2009 | Andersen | ............. | F03D 9/008 |
| | | | | 417/334 |

* cited by examiner

_US 10,247,168 B2_

ROTATIONAL MECHANICAL TRANSFORMER APPARATUS AND METHODS

CROSS REFERENCE TO RELATED APPLICATIONS

The current application is related to Serbian Patent No. 52650 issued Jun. 28, 2013. In addition, the current application is related to and claims benefits from the International Application NO. PCT/RS2008/000009, entitled "MECHANICAL OSCILLATOR", filed Apr. 23, 2008, and published under the Patent Cooperation Treaty (PCT) on Aug. 13, 2009 under the International Publication No. WO 2009/099347A1. The above International Application is incorporated herein by reference.

FIELD OF THE INVENTION

The invention relates generally to methods and instruments for transformation of energy, momentum, work and/or force associated with at least one working or reacting fluid. More particularly, the instant invention pertains to devices and pertained methods for transformation, storage, transport, and/or utilization of energy associated with particular class of working fluids. It may be noted that the devices and methods of the current invention may not be limited by the choice of the working fluid (as long the particular working fluid has been chosen to be compatible with the fluid-facing materials as chosen by design of particular embodiments. For example, working fluids may be chosen (but not limited by) from the set of working fluids consisting of compressed or atmospheric air, nitrogen, nitrogen oxides, oxygen, argon, carbon monoxide, carbon dioxide, water, water vapor, monohydric alcohols, polyhydric alcohols, hydrocarbons, gasoline, Diesel fuel oils, petroleum naphtha, heavy fuel oil, marine fuel oil, heating oil, crude oil, mineral oil, vegetable oil, ketones, acetones, benzophenones, mixtures of the above and mixtures of oxidation products of the above.

BACKGROUND OF THE INVENTION

The instant invention pertains to methods which and apparatus for transformation of energy, work, torque and/or momentum originally contained in one or more working fluids encompassed in at least one working volume (generally indicated, as a "cylinder" regardless of the actual stereometric forms of particular embodiments) and arranged to act upon at least one surface of a reciprocating mass (usually known to the practitioners as "piston"). In the embodiments of the instant invention, the working volumes and the reciprocating masses (i.e. cylinders and pistons) have been arranged to perform periodic motion with respect to at least one support point of at least one axis, fulcrum, shaft, pivot, bar, beam, or any combination of the above.

In general, mechanical transformers, including, but not limited to motors (e.g. external and internal combustion engines), pumps, turbines, actuators, and/or servo units, utilizing, rotating, oscillating, u980ndulating, and/or pendulating pistons and cylinders have been known from the pioneering times of the design of mechanical devices. One of early informative listings and reviews of different types of such may be found, for example in "Knight's American mechanical dictionary": a description of tools, instruments/ machines, processes and engineering, history of inventions, general technological vocabulary; and digest of mechanical appliances in science and the arts", assembled by Edward H. Knight and published by J.B. Ford and Company in New York as early as 1874 (available commercially as a hard copy and as internet-downloadable content of multitude web pages).

One class of specific mechanical arrangements pertains to multiple rotating pistons (rather than internal rotors) rotary aviation engines represented by well-known "Gnome" rotary engine, at least us proposed in 1907 by Sequin brothers as a seven cylinder four-stroke engine and widely used, during the World War I era, as a fighter aircraft power plant. One particular feature of the above and related rotating piston engines, pumps, and other mechanical transformers is a hinged connecting rod arranged to deflect (as a whole or in sections) with respect to the piston head.

Consequently, the deflection of the connecting rod may induce unbalanced forces and moments, leading to undesirable vibrations, stresses, and/or inefficiencies. In contrast, the connecting rods of the devices in accordance with the instant invention stay favorably-aligned with respect to the pistons' heads and cylinder's supports resulting in advantageous balance of the entire device. The devices of the instant invention have substantially no alignment-induced limitations on the lengths of the cylinders and associated connecting rods having additional benefits in energy efficiency and added torque.

SUMMARY OF THE INVENTION

A rotational mechanical transformer arranged for transfer and transformation of velocity, force, angular momentum, torque, energy/work, energy density, and pressure associated with at least one rotating device containing at least one working fluid comprised of at least one actuator including at least one cylinder arranged to contain the at least one working fluid, at least one externally supported shaft and at least one drive shaft, having parallel axes orthogonally displaced by a predetermined displacement, and each respectively connected to at least one connecting arm and at least one additional connecting arm. The at least one cylinder includes at least one actuator rod and at least one blind end each respectively connected with at least one revolving eccenter axle and the at least one drive shaft, and arranged to allow for angular displacements of the at least one actuator with respect to the parallel axis. The at least one revolving eccenter axle has been rotationally connected to the at least one connecting arm and at least one revolving eccenter bar, while the at least one revolving eccenter bar has been rotationally connected to the at least one additional connecting arm via at one additional revolving axle. While, the predetermined displacement has been arranged to be substantially equal to an effective length of the at least one revolving eccenter bar.

DETAILED DESCRIPTION

In the following description of embodiments of the present invention, numerous specific exemplary details are set forth in order to provide a more thorough understanding of the present invention. However, it will be apparent to one skilled in the art that the present invention may be practiced without one or more of these exemplary details. In other instances, well-known features of prior art have not been described in detail to avoid unnecessarily complicating the description.

Figure 1:
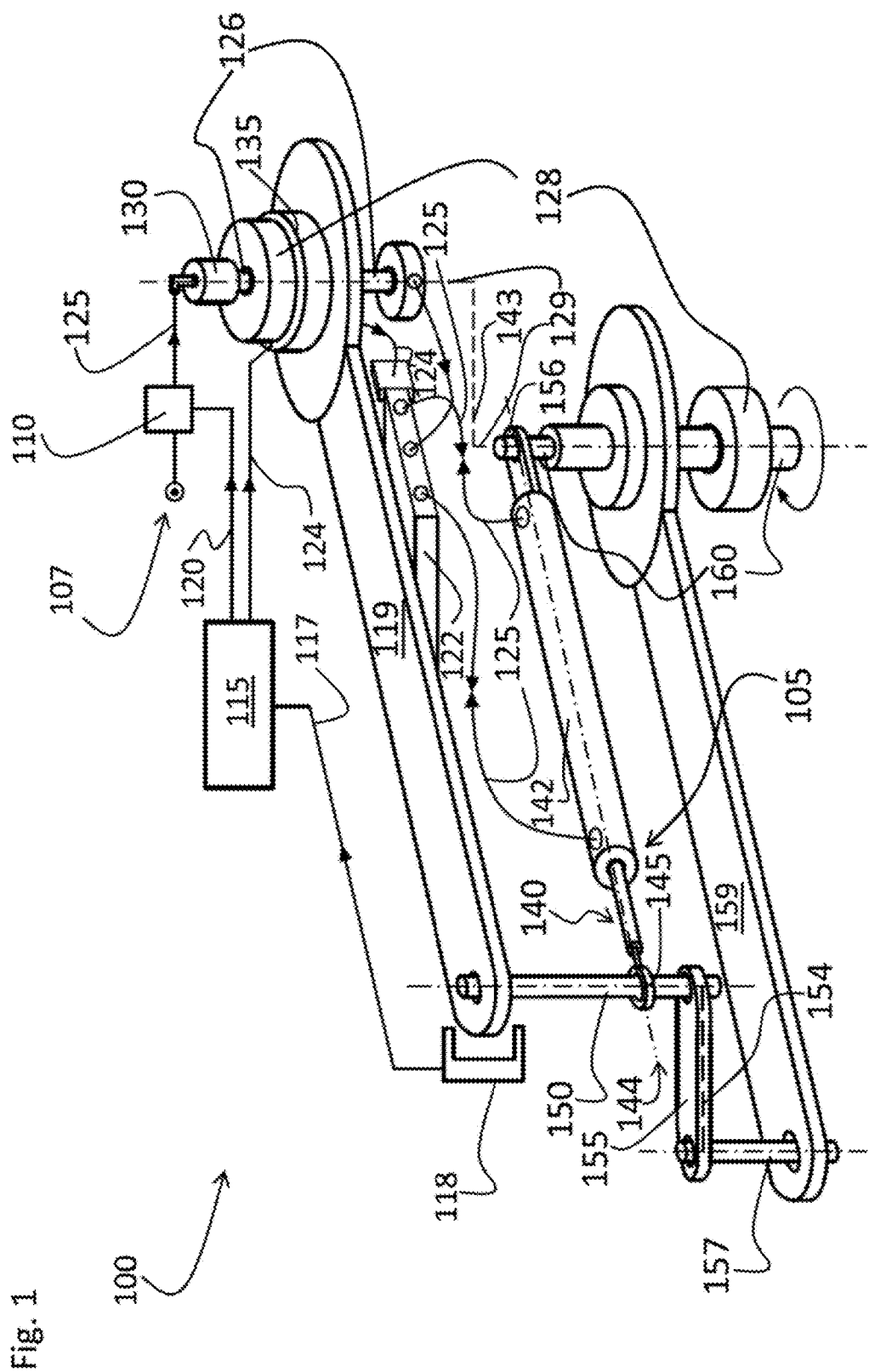
FIG. 1 is a schematic illustration of an exemplary embodiment of the present invention.

One basic embodiment of the rotational mechanical transformer in accordance with the current invention has been illustrated schematically in FIG. 1. In the illustrated embodiment, the rotational mechanical transformer 100 includes at least one actuator 105 having at least one cylinder 142 (e.g. Dual Action Air Cylinder—Manufacturer; BIMBA; 1¹⁄₁₆" Diameter, 5" Stroke, as commercially available from McMaster-Carr at www.McMaster.com; Aug. 29, 2016), that contains at least one internal piston 610, and being arranged to receive at least one pressurized working fluid from external working fluid supply, via at least one working fluid connector 107. The flow of the at least one working fluid may be adjusted using at least one proportional flow control valve 110 (e.g. Mini Proportion Control Air Valve available commercially from Technocraft Inc. P/N 209231 or similar) controlled by at least one controller 115 (e.g. Microcontroller from Inland; M/N; Arduino Uno r3; using processor ATmega32; commercially available at: www.microcenter.com; Aug. 29, 2016). The input ports of the at least one controller 115 may be connected via input digital data conduit 117 to at least one position sensor 118 arranged to detect presence of at least one revolving connecting arm 119.

The at least one controller 115 has been programmed to control the flow of at least one working fluid through the at least one proportional flow control valve 110 using, for example, an analog output electric conduit 120, while at least one working fluid control valve 122 (e.g. Wic Valve's commercial pneumatic 4 way 2 position control valve, M/N: 4V210-4V, 3.7 W) may be controlled via digital data conduit 124 using digital feedback signal via conduit 117 from optical sensor 118, to provide timed switching in order to control chosen rotational direction and rotational speed (RPM). Solenoid control valve 122 ports are arranged to operate in an opposite mode. When one is receiving the working fluid, the other is connected to the exhaust port. The digital data conduit 124 may be coupled to the revolving parts of the rotational transformer 100 (e.g. at least one working fluid control valve 122 arranged connectively at the at least one connecting arm 113) via at least one electric slip ring 135.

The at least one working fluid may be supplied to the actuator 105 via at least one externally-supported shaft 126 which may include internal passage ways for supplying at least one working fluid to the at least one working fluid control valve 122 and/or clearances for electric conduits like the digital data conduit 124. In the embodiment illustrated in FIG. 1, the at least one externally-supported shaft 126 is hollow to provide air passage and at least one electric slip ring 135 to provide electric connectivity to the at least one solenoid control valve. In addition, a working fluid rotary union 130 may be used in particular embodiments to couple at least one working fluid conduit 125 and the at least one externally-supported shaft 126. Also, the working fluid passages may be divided to support a plurality of actuators 105.

In addition, in different embodiments, the output end of the shaft 126 may be arranged in the form of a distributor or a working fluid splitter structured to channel the working fluid to each working fluid control valve 122. Each of the working fluid solenoid control valve 122 has been structured and programmed to control the flow of the working fluid to each actuator 105 such that, in general, the working fluid flow through pertinent working fluid conduits 125 may be reversed for each half cycle of the actuator 105 rotation to drive extension/contraction of the actuator rod 140. Also, depending upon particular embodiments, the externally supported shaft 126 may be supported by bearings 128 arranged to facilitate rotary motion around either of at least two externally supported and stabilized axes 129, generally arranged in mutually parallel configuration and positioned having a predetermined displacement 143 in a plane perpendicular to the axes 129. The predetermined displacement 143 of the axes 129 has beer-chosen to be equal to the effective length 154 of any of at least one revolving eccenter bar 155.

In the FIG. 1, illustrated embodiment, at least one actuator rod 140 has been attached via rod bushing 145 to actuate at least one revolving eccenter axle 150 arranged to couple at least one connecting arm 119 and the at least one revolving eccenter bar 155, while at least one additional revolving axle 157 connects the at least one revolving eccenter bar 155 and at least one additional connecting arm 159. The at least one additional connecting arm 159 has been firmly connected to the drive shaft 160 which may be arranged to couple energy and momentum, to the outside parts external to the rotational mechanical transformer 100. Furthermore, a blind end of the cylinder 142 has been attached to the drive shaft 160 via at least one blind end bushing 156 arranged to allow for angular displacements of the actuator 105 with respect to the axis 129. It may be noted that, in alternation, in similar or different embodiments, the connection arrangement of the actuator 105 may be reversed such that, in reversed alternative, the at least one blind end bushing 156 may be connected to the at least one eccenter bar 155 while the at least one connecting rod 140 may be connected to the at least one drive shaft 160. Nevertheless, in any alternative embodiments, the above connections may be arranged to allow for the angular displacements of either end of the actuator 105 such that co-linearity of a common longitudinal axis 144 of each cylinder 142 and the pertinent actuator road 140 may be preserved during the angular displacement, thus substantially eliminating mutually-induced stresses and vibrations.

It may be noted that in different embodiments (including some discussed below) the coupling of rotational energy and momentum may be arranged differently (e.g. via coupling to at least one externally supported shaft 126, or coupling to both, the externally supported shaft 126 and connected to the drive shaft 160 at the same time).

Figure 2:
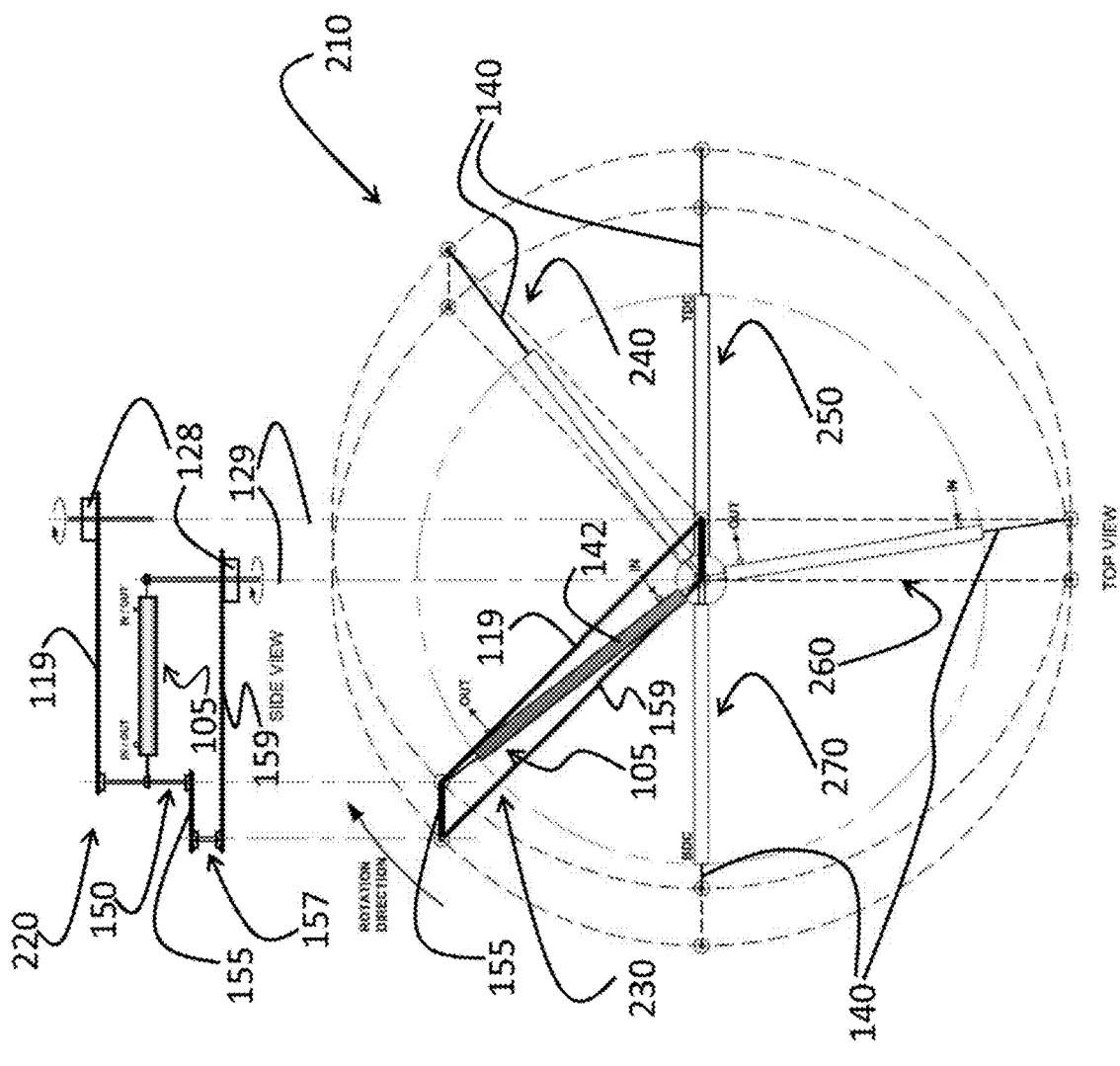
FIG. 2 is another schematic illustration of an exemplary embodiment of the present invention.

Additional aspects of the rotational mechanical transformer 100 in accordance with the current, invention may be more clearly illustrated in cross-sectional projections (top view 210 and side view 220) depicted in FIG. 2. For clarity, FIG. 2 represents principle mechanical components of a single actuator embodiment analogous to such illustrated in the prospective representation in FIG. 1 (i.e. corresponding parts are associated with reference numerals common to FIGS. 1 and 2). Nevertheless, the features, as discussed below that pertain to the FIGS. 1 and 2 may be directly extrapolated by the competent practitioners to several multi-cylinder embodiments.

As evident in FIG. 2, for example from, the top view 210, the rotation of the rotational mechanical transformer 100 has been indicated by five consecutive angular positions (230, 240, 250, 260, and 270) corresponding to consecutive time instances t1-t5 during a single rotational period of the rotational mechanical transformer 100. It may be directly observed that positions 250 ("top dead center" or "TDC" in FIG. 2) and 270 ("bottom dead center" or "BDC") represent times (t3 and t5 respectively) of extreme extensions of the actuator rod 140, and, consequently, times (and positions) of zero torque (or moment of force) because of co linearity of forces and position vectors with respect to the centers of each and any of the bearings 128.

It may also be noted that, in contrast to numerous rotating devices(e.g. piston actuated internal combustion and/or steam powered engines), displacements of the actuator rod 140 remain substantially co-axial with the cylinder 142 at all times during the rotating cycle of the rotational mechanical transformer 100, thus avoiding unbalancing torques loading the supporting structures of the rotating devices of prior art and causing unwonted stresses and vibrations. Furthermore, such arrangements of the parts of the rotational mechanical transformer in accordance with the current invention allow for utilization of longer cylinders and longer stroke pistons where the stroke may be significantly larger than pertinent piston's diameter (easily exciding 10 or more piston diameters). In contrast, typical internal combustion automotive engines utilize, for example, connecting rods having longitudinal dimensions commensurate to the piston diameter while not exceeding approximately 3.5 piston diameters). This particular feature of the current invention, in turn, allows for substantially higher energy extraction (conversion) out of relatively lower pressure working fluids.

It may be noted that in the class of embodiments having one end of each cylinder 142 fastened (e.g. via the at least one blind end bushing 156) to one of the drive shaft 160, as illustrated in FIG. 1, the length of the piston stroke has been geometrically predetermined by the choice of the effective length 154 of the revolving eccenter bar 155. It follows from, the geometry (as illustrated) that the protruding length of the actuator rod (i.e. useful length of the cylinder 142) may not exceed two effective lengths 154 of the associated eccenter bar 155. Nevertheless, it may be also deduced from the above FIGS. (e.g. the side view 220) that, if allowed by a design choice in different embodiment, by connecting the cylinder 142 to the pertinent drive shaft 160 closer to the mid-point (or even in proximity to the rod end of the cylinder 142. Longer cylinders (e.g. associated with eccenter bars of various, adjustable, or continuously adjustable effective lengths 154) may be utilized.

Figure 3:
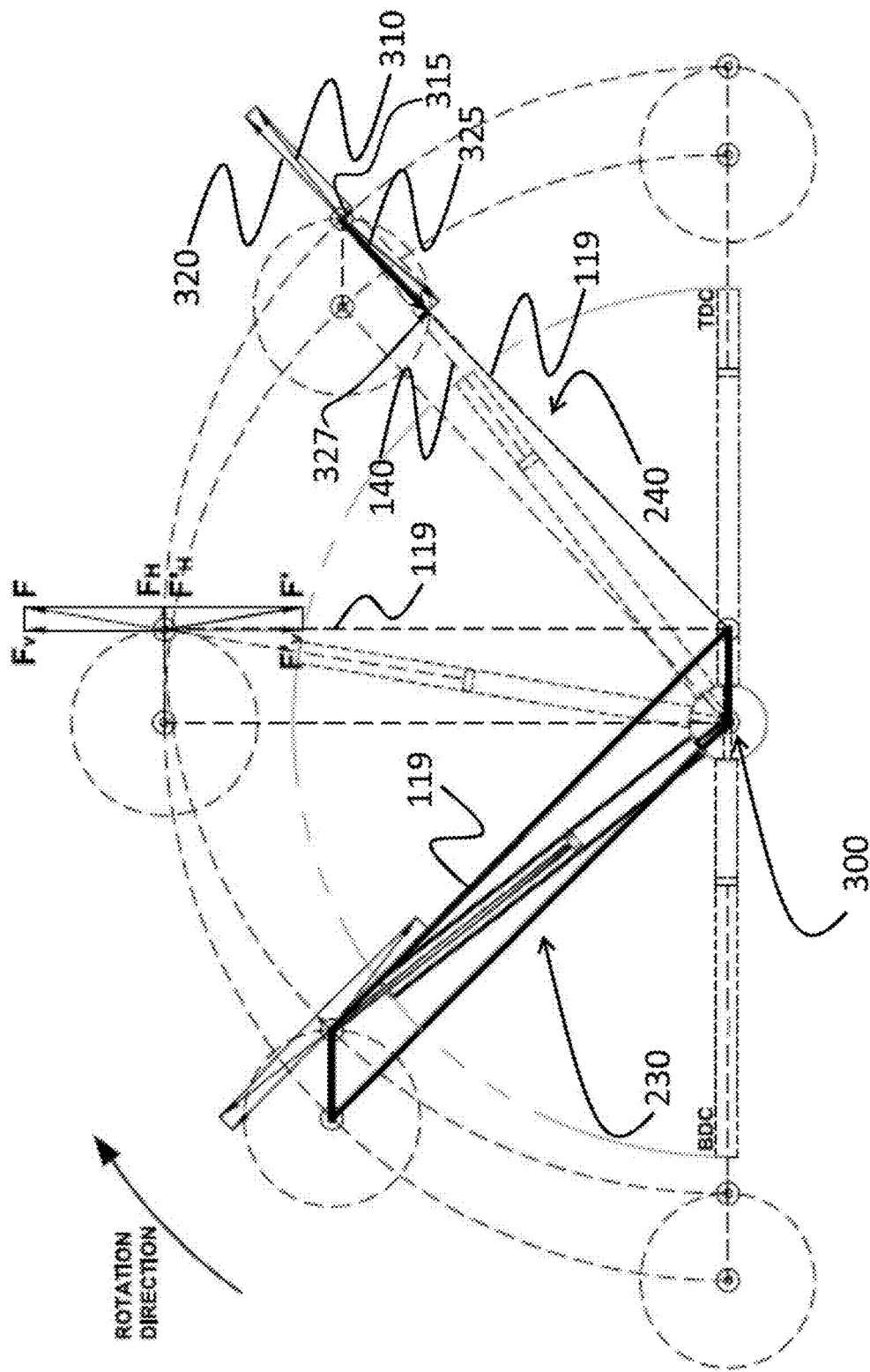
FIG. 3 is yet another schematic illustration of an exemplary embodiment of the present invention.

An additional mechanical feature distinguishing the rotational mechanical transformer 100 in accordance to the current invention may be illustrated by analysis of moments of forces (torques) as illustrated in FIG. 3. One may note that the analysis of torques with respect, for example, to the point 300 defined by the drive shaft 160 at a chosen time t2 (corresponding to the position 240) may provide sufficient generality of conclusions applicable to any time point during any revolution of the rotational mechanical transformer 100 (e.g. time t1 corresponding to the position 230). At the particular time t2 the actuator rod 140 applies a force F 310 which may be represented as a vector sum of a force Fh 315 and a tension force Fv 320. The (vector) force Fh 315 directly contribute to the torque around the point 300, while the force Fv 320 is balanced by the tension Fv' 325 along the pertinent revolving connecting arm 119. It may be noted that the tension Fv' 325 also contributes to the torque at 300 (e.g. by the action of the perpendicular component F'v 327). Furthermore, one may conclude that the above torque components contribute substantially equally (at least when integrated or averaged over the revolutions of the rotational mechanical transformer 100). It also may be noted that the later contribution has no corresponding analogy in the conventional designs at least because of the absence of the revolving connecting arm 119 in such designs. Finally, one may note that, as noted above, the preceding analysis may be repeated for any point in time during the rotation, with the possible exceptions of the "TDC" 250 and the "BDC" 270 positions where (and when) all torques vanish because of co-linearity, as discussed above.

Figure 4:
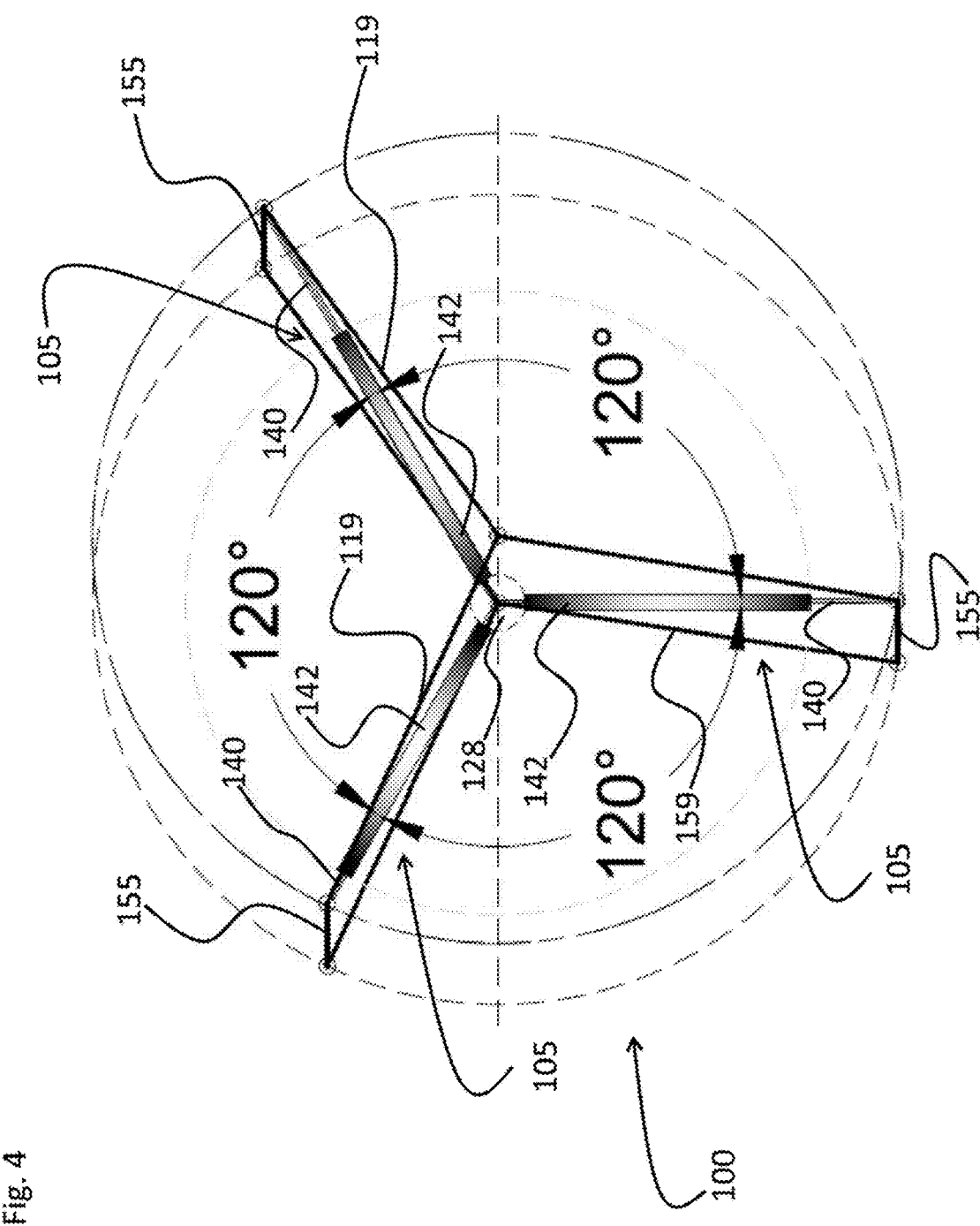
FIG. 4 is a schematic illustration of a different embodiment of the present invention.

An additional class of embodiments of the rotational mechanical transformer 100 has been schematically illustrated in FIG. 4. In such embodiments, a plurality of actuators 105 has beer-arranged in a substantially axisymmetric arrangement (with respect to the drive shaft 160). It can be noted that number of actuators 105 may be limited by the choices of the specific design having no limits pertinent to the fundamental principles of the rotational mechanical transformer's functionality.

It may be also noted that other components of the rotational mechanical transformer 100 (controllers, conduits, etc.) not critical to the geometry of the actuators 105 have been omitted from the schematic in the FIG. 4, and may be considered variable by the choice of the practitioners and in accordance to established engineering and design practices.

Furthermore, it may be noted that, in addition to multiplicative features of the multi-actuator rotational mechanical transformers 100, relative to the obvious enhancements in power, torque, or moment of inertia (relative to embodiments having single actuators), the multi-actuator embodiments offer additional opportunities for further balance enhancements and mechanical stress and vibration control. Actually, it may be directly evident to the practitioners that in embodiments with even number of actuators (e.g. embodiments having pairs of oppositely arranged substantially similar actuators operationally phased "in opposition") any undesirable action of one actuator 105 may be coupled by the simultaneous and opposite action of the opposing paired member. Furthermore, even in the axisymmetric embodiments with odd number of actuators 105, any undesirable action of some actuators may be balanced, at least in significant portion, by corresponding simultaneous summary action of other actuators (many of which are in opposite phases of the cycle, substantially by the virtue of the axial symmetry).

For example, the protrusion (out of the cylinder 142) of one actuator rod 140 has been mostly compensated by retraction the two remaining rods. Therefore, the displacement of the center of the mass of the entire system during one revolution may be much smaller that the length of the revolving eccenter bar 155, which, as discussed above, limits the displacements of the pistons and associated actuator rods 140.

Figure 5:
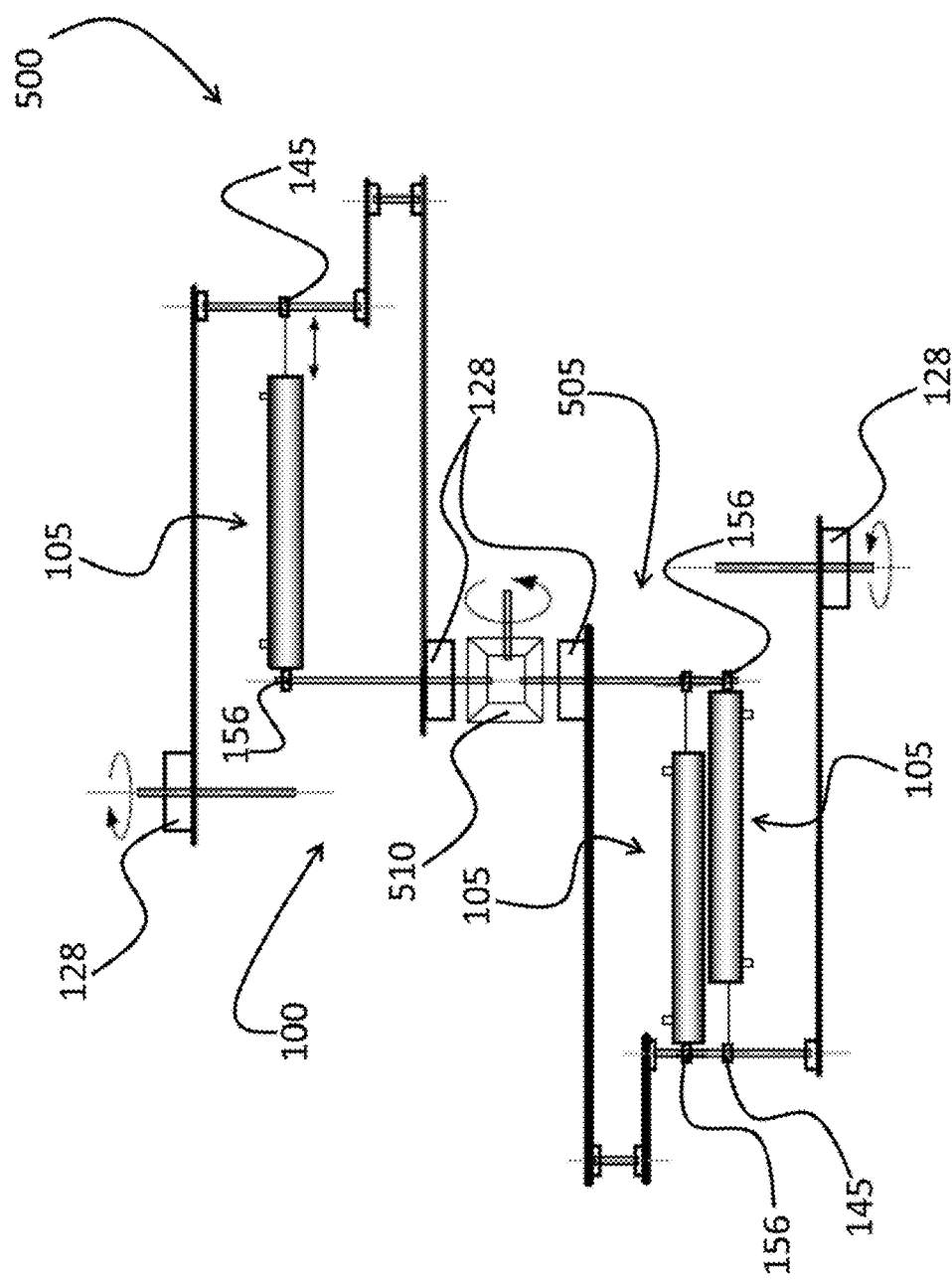
FIG. 5 is a schematic illustration of another different embodiment of the present invention.

In addition to axysymmetric embodiments represented by the schematics in FIG. 4, rotational mechanical transformers 100, as basic operational units, may be combined in modular rotational mechanical transformers 500, schematically illustrated in FIG. 5. In the illustrated embodiments, the at least one basic unit of the rotational mechanical transformer 100 module, as disclosed above, may be mechanically coupled with an additional (similar or different) basic unit module 505 via one or more coupler units 510 (represented by a gearbox) in the modular transformer 500.

More particularly, the additional basic unit module 505 incorporates at least one pair of actuators 105 coupled in opposition, for example to augment the output power and torque (relative to such of the single actuator 105) substantially without increase of undesirable vibrations and stresses. Similarly, it may be noted that the coupler units 510 may be synchronous (i.e. arranged to preserve common rotational velocity as chosen). Consequently, prearranged differences in phases of rotation may be also preserved, which in turn allows for an additional free parameter potentially useful, for example, for further balancing of the entire modular transformer 500.

It may be also noted that the coupler unit 510 may be arranged elsewhere in the transformer 500. For example, one or more couplers units 510 may be, e.g. by design choices in different embodiments, associated to any (or all) of the shafts 126 and/or 160, and arranged to combine equal (or variable) power and torque levels. Also, some of such couplers may be arranged to connect additional basic unit modules or clusters and combinations of such modules chained in arrangements pertinent to particular applications.

Figure 6:
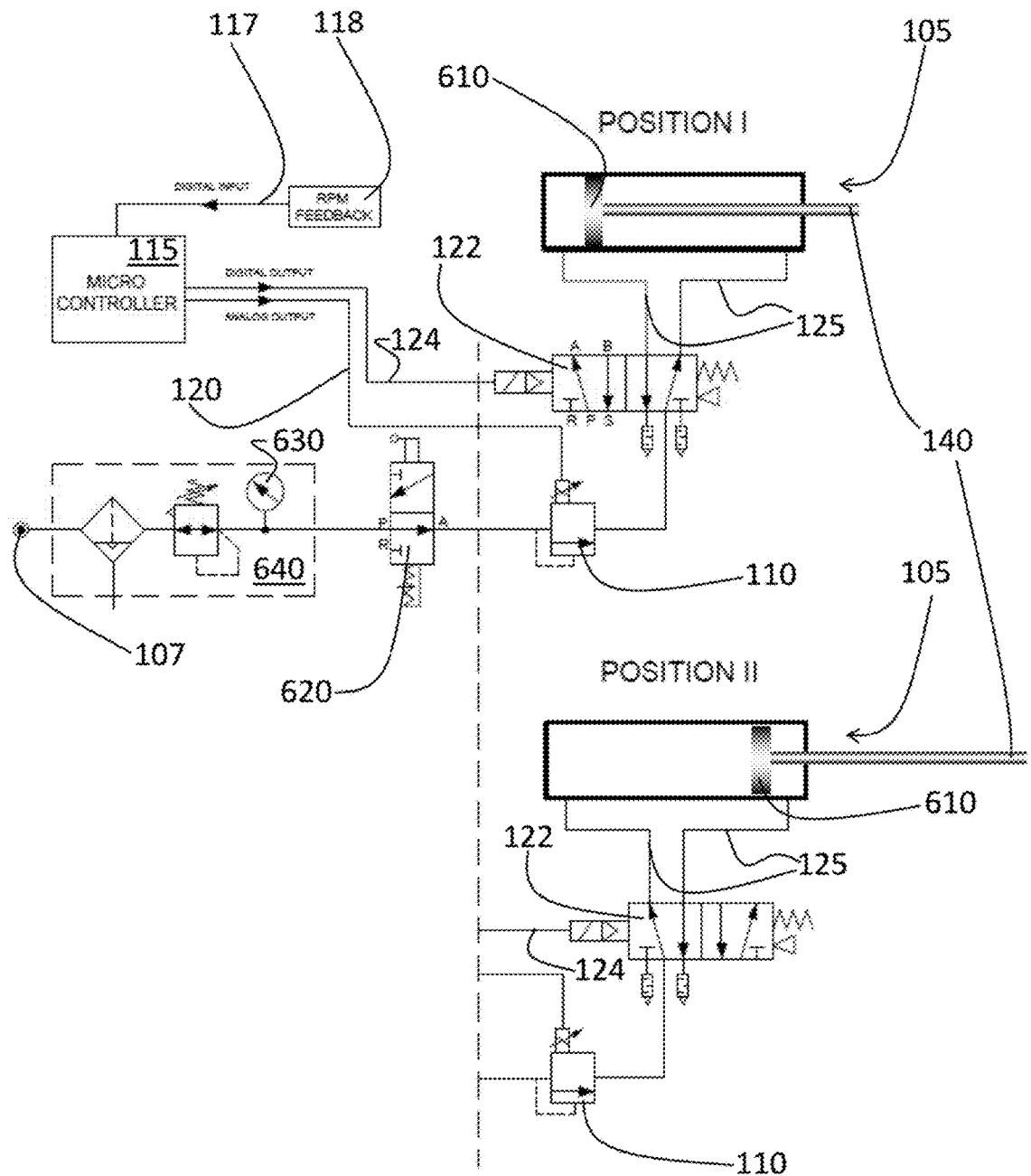
FIG. 6 is an additional schematic illustration of an exemplary embodiment of the present invention.

FIG. 6 illustrates more detailed pneumatic scheme of the embodiment illustrated in prospective in FIG. 1. In FIG. 6 the actuator 105 has been illustrated in the POSITION I corresponding with BDC (position 270 in FIG. 2), while the POSITION II in the FIG. 6 corresponds to the TDC (position 250 in FIG. 2). Thus, POSITIONS I and II correspond to the times at which digital signal from the at least one controller 115 changes the state (ON/OFF) on the at least one working fluid control valve 122 in order to reverse the pressure on the at least one piston 610.

It may be noted by practitioners (inter alia, from the FIG. 6) that, at least in this embodiment, the rotational mechanical transformer 100 may be arranged to function interchangeably in either direction of energy flow. As discussed above, the controller 115 may be programmed to actuate the working fluid control valve 122 such that potential energy of the pressurized working fluid at the connector 107 may be transformed into the kinetic energy of the piston 610, and consequently, the actuator rod 140. In contrast, if the mechanical energy (work) is coupled from outside to the actuator rod 140, the controller 115 reprogrammed to operate the working fluid control valve 122 "in reverse" (i.e. state of properly pressurized valve 122 switched from POSITION I into POSITION II in FIG. 6), when at least one OK/OFF valve 620 is arranged in the "ON" state (as illustrated) and the filter regulator 640 has been switched around (i.e. connected "in reverse" from the arrangement illustrated in FIG. 6) at least one manometer 630 may indicate increase of the working fluid pressure at the connector 107. In short, the rotational mechanical transformer 100 may be acting on the working fluid as a pump, thus increasing the pressure (i.e. thermal energy density) of the working fluid with each stroke of the piston 610 at the "reversed" connector 107.

Figure 7:
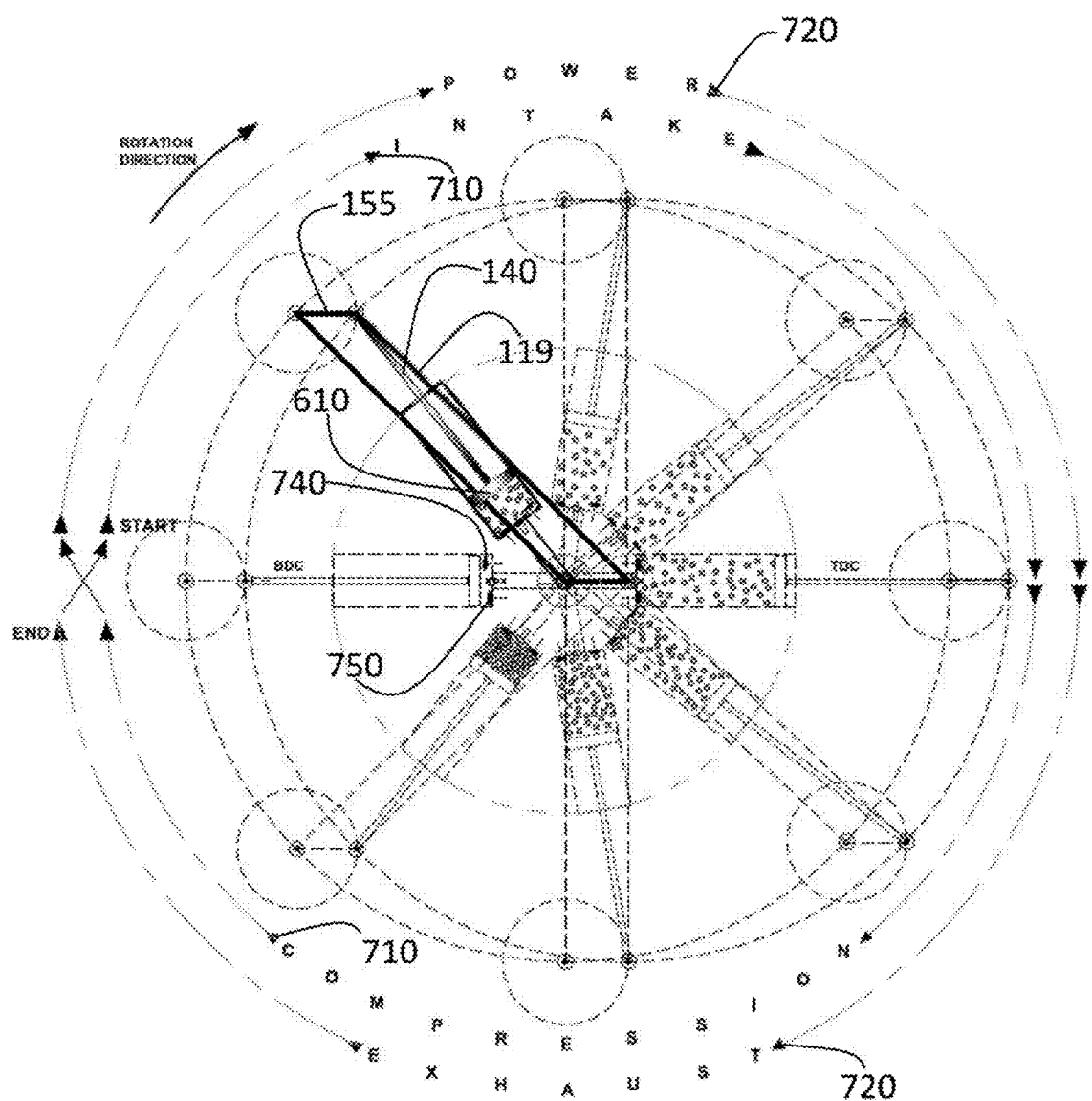
FIG. 7 is a schematic illustration of a different class of embodiments of the present invention.

A different class of embodiments of the rotational mechanical transformer in accordance with the current invention has been illustrated schematically in FIG. 7. The FIG. 7 represented exemplary embodiment (chosen and arranged in close analogy with such in FIG. 1) also includes the at least one actuator 105 arranged having the cylinder 142 that contains one internal piston 610. In contrast to the embodiments illustrated in FIGS. 1-6, the FIG. 7—illustrated embodiment has been arranged to generate a super-atmospheric pressure working fluid internally by internal combustion well known from the arts and practices of internal combustion engines.

The schematic illustration in FIG. 7 follows well-known "four stroke" internal combustion engine operating cycle. Thus, the full cycle of the illustrated engine operation may be completed in two full rotation of the rotational mechanical transformer 100 (i.e. four strokes of the piston 610 identified as the "INTAKE" and "COMPRESSION" on the inner arrows 710 and the "POWER" and "EXHAUST" on the outer arrows 720). As well known from the internal combustion engines art, the piston 610 positions for the "INTAKE" ("COMPRESSION") and "POWER" ("EXHAUST") mutually correspond to each other (mutatis mutandis). Schematic renderings of at least one intake valve 740 and the at least one exhaust valve 750 have also been included.

It may be noted that details of the combustible mixture preparation (e.g. carburetion or fuel injection), valving, timing, and ignition (e.g. electric arc, plasma injection, and/or auto ignition by compressions) have been omitted from this Application as being generally well-known to the practitioners over the past centuries. Nevertheless, it may be reemphasized that all internal combustion embodiments (as discussed above or as will be elaborated below) at least have advantages of low vibrations mostly due to the collinear motion of the piston 610 and the actuator 140, and high torque, as above attributed to mechanical actions of the at least one connecting arm 119 and the at least one revolving eccenter bar 155.

Figure 8:
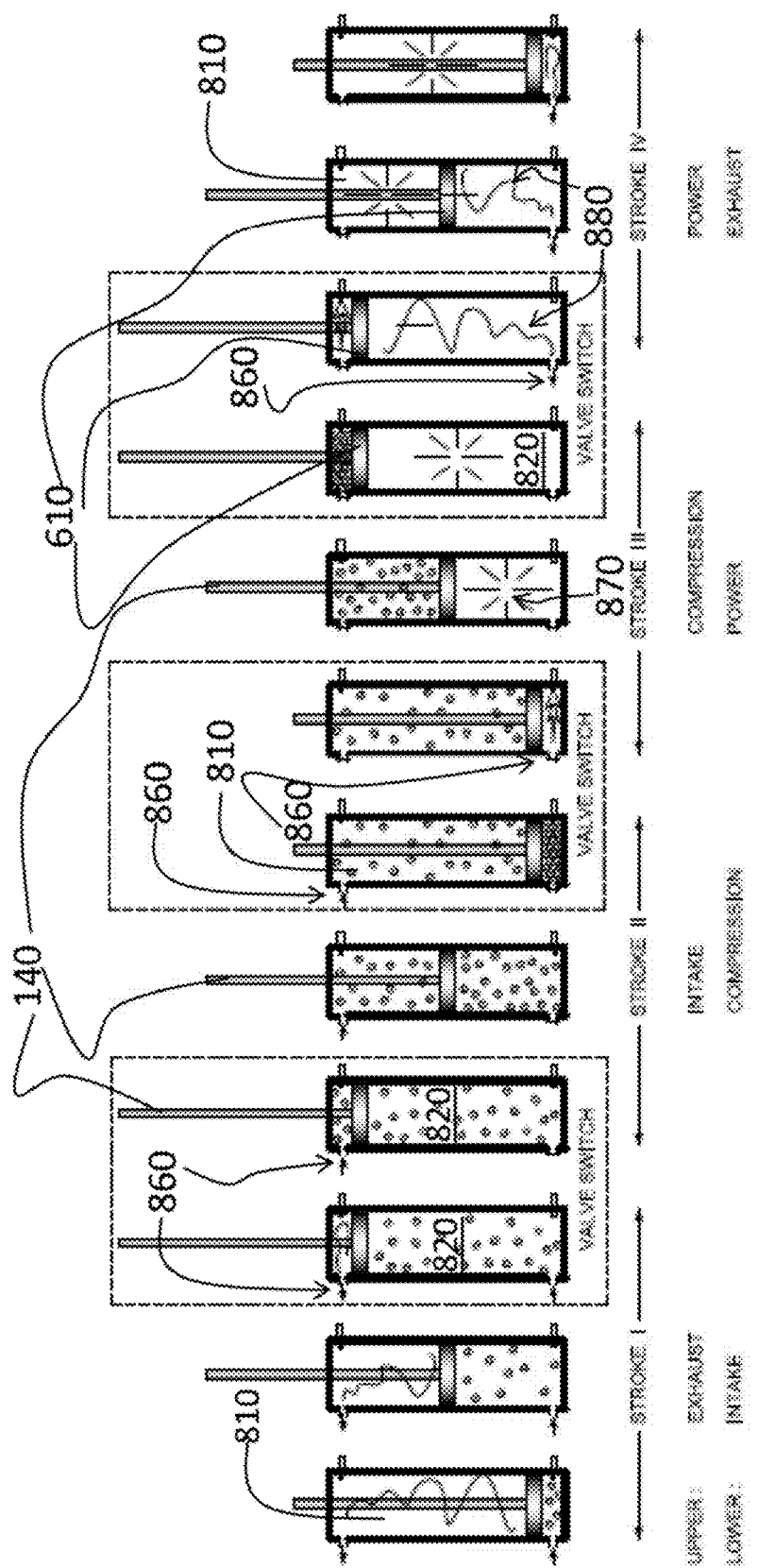
FIG. 8 is an additional schematic illustration of a different class of embodiments of the present invention.

It may be also noted that many other arrangement of the internal combustion cycles, including well-known versions of different "two stroke" or "two cycles" and its mixtures and variations may be used in various internal combustion embodiments of the present invention. In addition to such, the rotational mechanical transformer of the current invention may operate in an internal combustion manners using cycles customarily unavailable to the internal combustion engines having broad commercial acceptance. Some significant features of such cycle have been simultaneous execution of corresponding strokes at opposite volumes separated by the instantaneous positions of the piston 610. Following the orientation of the actuators as schematically given in FIG. 8, and noting that this figure has been created by a parallel depictions of stages of operation at different angular positions (for example, some corresponding to angular positions "TDC" 250 and "BDC" 270 in FIG. 2), one may note from the FIG. 8 that "UPPER" designations of strokes relates to the volumes 810 containing (at least partially) the actuator rod 140, while the designation "LOWER" corresponds to strokes corresponding to the opposite (relative to the piston 610) volumes 820. It may be also noted that positions 830, 840 and 850 correspond to switching of the state of the INTAKE/EXHAUST valve 860 at the common volumes 810 and 820 of the working fluids. In addition, may be noted that the star symbol 870 indicates combustion of the combustive mixtures in the pertinent volumes, while the curly shape 880 denote working fluids flow (laminar or turbulent) during the "INTAKE" and/or "EXHAUST" strokes.

Figure 9:
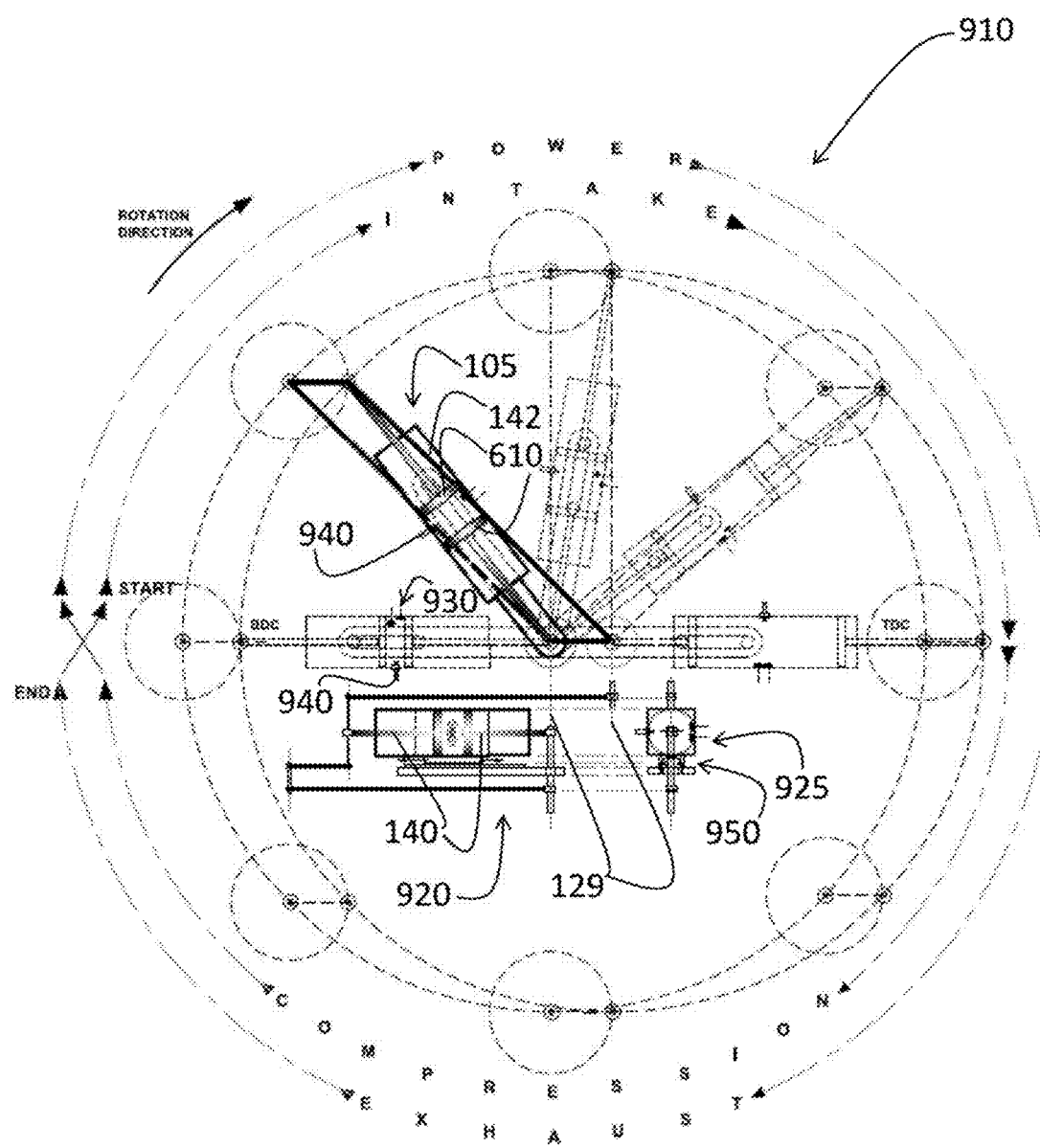
FIG. 9 is a schematic illustration of a different subclass of embodiments of the present invention.

Different internal combustion embodiments may be illustrated schematically in FIG. 9. As above (e.g. in FIG. 2) two orthogonal cross-sectional views (top view 910, side view 920), and an additional rear view 925 have been illustrated. Such embodiments may be characterized by a pair of opposing pistons 610 arranged to operate in a common cylinder 142. Such arrangement (commonly referred to as an "opposed piston" configuration) may require valves 930 (both input and exhaust) positioned at the cylinder 142 side boundaries. In addition, an ignition device 940 may be also included if needed. It may be noted that the ignition devices 940 may not be needed in self-ignition embodiments (e.g. "Diesel engines") which may be attractive at least because of high compression ratios inherently achievable in the opposed piston configurations.

One additional feature of the above embodiments pertains to the radial shifting mechanism 950 arranged to allow for radial displacements of the cylinder 142 with respect to the two externally supported and stabilized axes 129. It may be evident to the practitioners that the radial shifting may be required at least because of the constant length of the actuator roads 140. Depending upon particular embodiments, versions of dovetail sliding mechanism may be utilized for this purpose. It may also be noted that high power density features inherent to the opposed piston configurations significantly augment high torque features discussed above, as in the paragraph pertinent to the FIG. 3.

Figure 10:
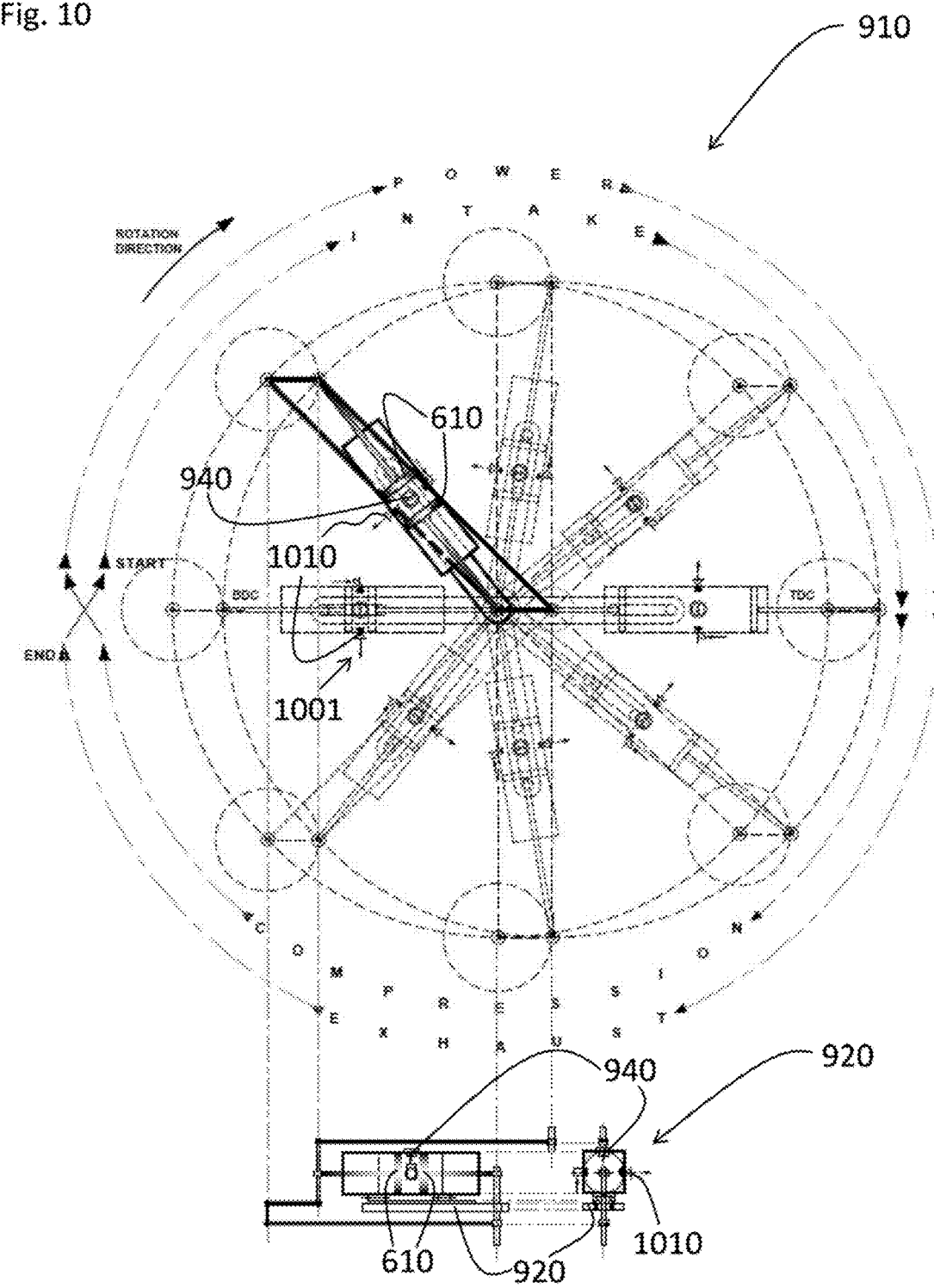
FIG. 10 is an additional schematic illustration of a different subclass of embodiments of the present invention.

Yet another internal combustion embodiment having the opposed piston configuration has been schematically illustrated in FIG. 10. (side view 920 and top view 910). In this embodiment, the exhaust (which may or may not include valves) has been arranged to project the exit fluids 1001 in tangential direction using directional exhaust nozzles 1010. It may be noted that the nozzles 1010 may take more substantial complex form In different embodiments, including, but not limited to convergent, divergent, convergent-divergent, and/or Venturi-type nozzles (for example arranged to in-mix the exhaust gases with the surrounding air).

Consequently, the tangential momentum of the exhaust gasses 1001 (as well as thermal energy of expending gasses converted in the directional flow of the mixtures) may superimpose to the torque, augment it, and contributes to the efficiencies of the rotational mechanical transformer in analogy to the action of well-known "ejector exhaust" systems and assemblies commonly associated with the internal combustion aviation engines.

Mechanical characterization and testing of the rotational mechanical transformer 100 have been conducted on the compressed air actuated embodiment as represented in FIGS. 1-4, and arranged to operate in angular velocity range from 0 RPM to about 500 RPM. Measurements of the driving momentum (output torque) and the dissipated power on the drive shaft 160 have been conducted using direct momentum measuring method utilizing device known as "Prony Brake" traditionally credited to one Gaspard de Prony (as per B. E. Baccock, The Design, Construction, and Use of a SMALL PRONY BRAKE, Gas Engine Magazine, July/August 2000;
http://www.gasenginemagazine.com/farm-shows/the-design-construction-and-use-of-a-small-prony-brake; Mar. 17, 2017). For these measurements, a predetermined continuously increasing breaking frictional force has been applied on the drive shaft 160 while a brake arm would, in turn, exert force on a force gauge. Readings of the force and the drive shaft 160 angular velocity (e.g. as RPM) have been simultaneously measured, and recorded.

The results of measured torque 1110 for the embodiments having 1 (dotted line), 2 (dashed line) and 3 (solid line) actuators 105 energized by the compressed air have been graphed in the RPM range from ~30 RPM to ~130 RPM. Torques from 0 Ncm to just below 800 Ncm has been measured using driving pressurized air up to 500 kPa.

Figure 11:
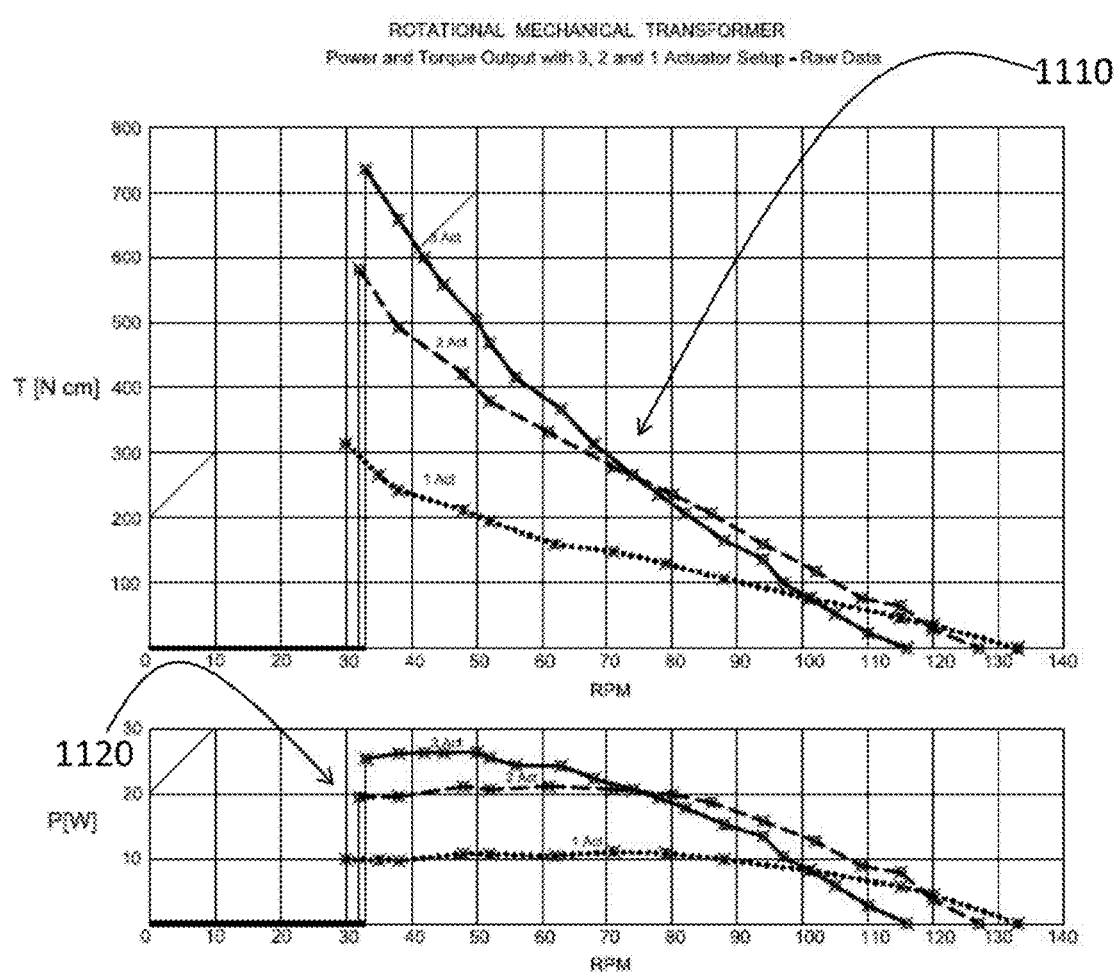
FIG. 11 is a graphic illustration of some features of an exemplary embodiment of the present invention.

Similarly, pertinent dissipated powers (torque×angular velocity, i.e. equal to transformed power) 1120 (in watts=Nm/s) have also been illustrated in FIG. 11. It may be noted (by direct observation) that, in this embodiment the rotational mechanical transformer 100 can "process" significant power in ranges of 30 RPM to about 120 RPM (corresponding to frequencies of 0.5 Hz-2 Hz) which conforms to operating frequencies of many wind or water powered turbines.

Figure 12:
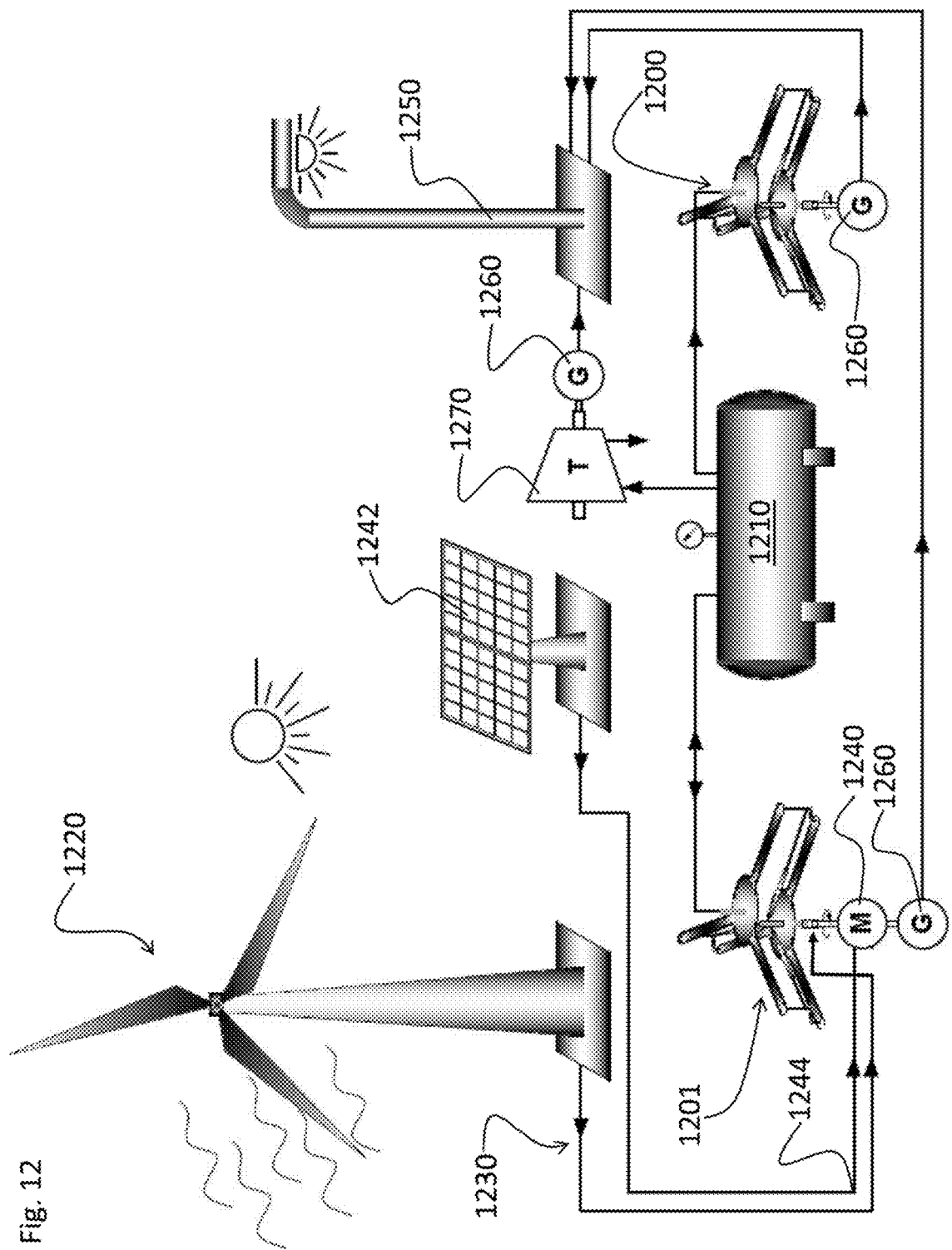
FIG. 12 illustrates schematically particular applications of different embodiments of the present invention.

FIG. 12 schematically illustrates one class of applications of aforementioned embodiments of the rotational mechanical transformer 100 in the field of renewable energy utilization. In the illustrated schematic, one rotational mechanical transformer subsystem (e.g. as an separate unit or as any of coupled combinations of rotational mechanical transformers) may be arranged as a pressurized fluid motor 1200 (as discussed above) while an additional (alternative) subsystem may be organized as reversible motor/pump 1201. The illustrated system includes at least one energy storage subsystems organized in one or more energy storage units 1210 (e.g. at least one pressurized working fluid storage volume arranged to receive, store, and release gaseous or liquefied working fluid).

In one mode of operation, mechanical energy of rotation of a renewable energy subsystem (for example in a form of wind installation 1220) may be directly mechanically coupled to the reversible motor/pump 1201 via at least one mechanical conduit 1230 having no additional intervening gears, cogwheels, friction couplers, or other mechanical transmission units. As indicated above, the reversible motor/pump 1201 can operate efficiently in the exemplary range of 0.5-2.5 Hz, minimizing the need (and associated losses) of additional interacting gears and mechanical transmission units. Alternatively, the reversible motor/pump 1201 may be actuated by at least one electromotor 1240, fed, for example, by electric energy from a solar installation 1242 via at least one electric conduit 1244.

Therefore, when the wind or solar energy (or combination of two) may be readily available, the unit 1201 may operate as a pump increasing the stored, energy by adding to the pressure of the working fluid in the storage unit 1210. As indicated above, at least in part because of high torque of the rotational mechanical transformers of present invention, pressures up to 500 MPa may be achievable even under moderate wind conditions and/or moderate insolation, In contrast, when the electric energy demands (e.g. by consumers 1250) the system may be controlled to operate "in reverse" (i.e. in electric energy delivery direction) generating electric power, e.g. by one or more electric energy generators 1260. It may be noted that generators coupled to the motors 1200 and 1201 may reacquire an additional mechanical transmission unit, e.g. in the form of an "upshift" gearbox, in order to operate at standardized frequency (50 Hz or 60 Hz). Alternatively, electric energy generators 1260 may be driven by at least one dedicated working fluid turbines 1270, as well-known in the art of electric power generation.

The present invention has been described with references to the above exemplary embodiments. While specific values, relationships, materials and steps have been set forth for purpose of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

We claim:

1. A rotational mechanical transformer arranged for transfer and transformation of velocity, force, angular momentum, torque, energy/work, energy density, and pressure associated with at least one rotating device containing at least one working fluid comprising:
   at least one actuator including at least one cylinder arranged to contain the at least one working fluid;
   at least one externally supported shaft and at least one drive shaft, having parallel axes orthogonally displaced by a predetermined displacement, and each respectively connected to at least one connecting arm and at least one additional connecting arm;
   wherein, the at least one cylinder includes at least one actuator rod and at least one blind end each respectively connected with at least one revolving eccenter axle and the at least one drive shaft, and arranged to allow for angular displacements of the at least one actuator with respect to the parallel axis;
   wherein, the at least one revolving eccenter axle have been rotationally connected to the at least one connecting arm and at least one revolving eccenter bar, while the at least one revolving eccenter bar have been rotationally connected to the
   at least one additional connecting arm via at least one additional revolving axle; and
   wherein, the predetermined displacement has been arranged to be substantially equal to an effective length of the at least one revolving eccenter bar.

2. The rotational mechanical transformer of claim 1 wherein the at least one working fluid has been chosen from set of working fluids consisting of compressed or atmospheric air, nitrogen, nitrogen oxides, oxygen, argon, carbon monoxide, carbon dioxide, water, water vapor, monohydric alcohols, polyhydric alcohols, hydrocarbons, gasoline, Diesel fuel oils, petroleum naphtha, heavy fuel oil, marine fuel oil, heating oil, crude oil, mineral oil, vegetable oil, ketones, acetones, benzophenones, mixtures of the above and mixtures of oxidation products of the above.

3. The rotational mechanical transformer of claim 1 including at least one working fluid control valve arranged to control the at least one working fluid flow such that the at least one working fluid may flow through the rotational mechanical transformer in either direction through at least one working fluid conduit.

4. The rotational mechanical transformer of claim 1 wherein, the at least one cylinder includes at least one actuator rod connected to the at least one revolving eccenter axle, and at least one blind end connected with at least one drive shaft, and both, the at least one blind end and the at least one actuator road, arranged to allow for angular displacements of the at least one actuator with respect-to the parallel axis.

5. The rotational mechanical transformer of claim 1 wherein at least one externally supported shaft has been formed as at least one working fluid splitter structured to channel the at least one working fluid to any of the at least one working fluid control valves.

6. The rotational mechanical transformer of claim 1, wherein the at least one cylinder and the at least one included actuator rod have been arranged to rotate and be together angularly displaced with respect to the parallel axes while retaining common longitudinal axis for substantial elimination of mutually induced misalignments and vibrations.

7. The rotational mechanical transformer of claim 1 wherein at least one force acting upon the at least one revolving eccenter bar and at least one tension force acting upon the at least one connecting arm induce torques contributing equally to the average output torque transferred by the rotational mechanical transformer.

8. The rotational mechanical transformer of claim 1, wherein a plurality of actuators has been arranged in a substantially axisymmetric arrangement with respect to the at least one drive shaft.

9. The rotational mechanical transformer of claim 1, wherein a plurality of actuators has been arranged in at least one basic unit modules, and at least another basic unit modules, each module including the at least one externally supported shaft and at least one drive shaft, and wherein the at least one basic unit module and the at least another basic unit module have been mechanically coupled using at least one coupler unit.

10. The rotational mechanical transformer of claim 1, further comprising at least one intake valve and the at least one exhaust valve, and wherein the at least one actuator has been arranged to generate at least on one side of the at least one piston the at least one super-atmospheric working fluid internally by internal combustion.

11. The rotational mechanical transformer of claim 10, wherein the at least one actuator further includes at least another intake valve positioned on the opposite side of the at least one piston with respect to the at least one intake valve, and at least another exhaust valve positioned on the opposite side of the at least one piston with respect to the at least one exhaust valve, and wherein the at least one actuator have been arranged to generate at least on one side of the at least one piston the at least one super-atmospheric working fluid internally by internal combustion arranged in sequence in at least two volumes on each side of the at least one piston.

12. The rotational mechanical transformer of claim 10, wherein the at least one actuator includes at least one pair of opposing pistons arranged in an opposed piston configuration, and the at least one intake valve and the at least one exhaust valve have been arranged positioned at least one cylinder side boundary.

13. The rotational mechanical transformer of claim 1, further comprising at least one exhaust nozzle chosen from a set of nozzles consisting of convergent, divergent, convergent-divergent, Venturi nozzle, and each combination of the above nozzles.

14. The rotational mechanical transformer of claim 1 arranged to operate in an angular velocity interval from 0 RPM to 500 RPM.

15. The rotational mechanical transformer of claim 14 wherein the transformed power has been substantially unchanged in a range of angular velocities from 30 RPM to 120 RPM.

16. A system for renewable energy utilization based upon at least one rotational mechanical transformer arranged for energy and pressure transformation comprising:
- at least one renewable energy subsystem;
- at least one rotational mechanical transformer;
- at least one energy storage subsystem; and
- at least one electric energy generator;
- wherein, the at least one renewable energy subsystem includes at least one wind turbine;
- wherein, the at least one rotational mechanical transformer includes at least one actuator including at least one cylinder arranged to contain the at least one working fluid; at least one externally supported shaft and at least one drive shaft, having parallel axes orthogonally displaced by a predetermined displacement, and each respectively connected to at least one connecting aim and at least one additional, connecting arm;
- wherein, the at least one cyclinder includes at least one actuator rod and at least one blind end each respectively connected with at least one revolving eccenter axle and the at least one drive shaft, and arranged to allow for angular displacements of the at least one actuator with respect to the parallel axis;
- wherein, the at least one revolving eccenter axle have been rotationally connected to the at least one connecting arm and at least one revolving eccenter bar, while the at least one revolving eccenter bar have been rotationally connected to the at least one additional connecting arm via at least one additional revolving axle;
- wherein, the predetermined displacement has been arranged to be substantially equal to an effective length of the at least one revolving eccenter bar; and
- wherein, the at least one energy storage subsystem has been arranged as at least one pressurized working fluid storage volume enabled to receive, store, and release the at least one working fluid in gaseous and/or liquefied states.

17. The system for renewable energy utilization of claim 16 further comprising at least one solar cell and at least one electromotor.

18. The system for renewable energy utilization of claim 16 further comprising at least one turbine powered by the at least one working fluid.

19. The system for renewable energy utilization of claim 16 wherein the at least one rotational mechanical transformer has been arranged to operate as at least one reversible motor/pump.

20. The system for renewable energy utilization of claim 19 wherein the at least one reversible motor/pump has been directly mechanically coupled to the at least one renewable energy subsystem having no additional intervening gears, cogwheels, friction couplers, or other mechanical transmission units.

* * * * *